US011836917B2

(12) United States Patent
Barral et al.

(10) Patent No.: US 11,836,917 B2
(45) Date of Patent: *Dec. 5, 2023

(54) SURGICAL VIDEO CONSUMPTION BY IDENTIFYING USEFUL SEGMENTS IN SURGICAL VIDEOS

(71) Applicant: Verily Life Sciences LLC, South San Francisco, CA (US)

(72) Inventors: Joëlle Barral, Mountain View, CA (US); Martin Habbecke, Palo Alto, CA (US); Lin Yang, Sunnyvale, CA (US); Xing Jin, San Jose, CA (US)

(73) Assignee: Verily Life Sciences LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,414

(22) Filed: Apr. 14, 2022

(65) Prior Publication Data
US 2022/0237792 A1 Jul. 28, 2022

Related U.S. Application Data

(63) Continuation of application No. 16/807,629, filed on Mar. 3, 2020, now Pat. No. 11,348,235.
(Continued)

(51) Int. Cl.
*G06T 7/136* (2017.01)
*G06V 20/40* (2022.01)
(Continued)

(52) U.S. Cl.
CPC ............ *G06T 7/0012* (2013.01); *G06N 20/00* (2019.01); *G06T 7/136* (2017.01); *G06V 20/49* (2022.01)

(58) Field of Classification Search
CPC ............ B21D 37/16; C21D 1/34; C21D 1/68; C21D 2221/00; C22F 1/00; C22F 1/04;
(Continued)

(56) References Cited

U.S. PATENT DOCUMENTS 5,801,685 A 9/1998 Miller et al.
6,535,639 B1 3/2003 Uchihachi et al.
(Continued)

FOREIGN PATENT DOCUMENTS

CN 1520561 8/2004
CN 1666510 9/2005
(Continued)

OTHER PUBLICATIONS

Amy Jin, "Tool Detection and Operative Skill Assessment in Surgical Videos Using Region-Based Convolutional Neural Networks," May 7, 2018,2018 IEEE Winter Conference on Applications of Computer Vison,pp. 691-696.*
(Continued)

*Primary Examiner* — Omar S Ismail
(74) *Attorney, Agent, or Firm* — Kilpatrick Townsend & Stockton LLP

(57) ABSTRACT

One example method for identifying useful segments in surgical videos includes accessing a video of a surgical procedure and user activities of a plurality of users who have watched the video of the surgical procedure. The user activities include operations performed during playback of the video. The method further includes dividing the video into multiple segments and determining a popularity score for each of the multiple segments based on the operations. Useful segments are identified from the segments based on the popularity scores. The method further includes generating metadata for the video of the surgical procedure to include an indication of the identified useful segments and
(Continued)

associating the metadata with the video of the surgical procedure.

20 Claims, 8 Drawing Sheets

Related U.S. Application Data

(60) Provisional application No. 62/822,106, filed on Mar. 22, 2019.

(51) Int. Cl.
  *G06T 7/00* (2017.01)
  *G06N 20/00* (2019.01)
(58) Field of Classification Search
  CPC ............ F27D 11/12; F27D 2099/0028; G06N 20/00; G06T 7/0012; G06T 7/136; G06V 20/20; G06V 20/44; G06V 20/49; G06V 20/70; G06V 2201/03; G06V 2201/10
  See application file for complete search history.

(56) References Cited

U.S. PATENT DOCUMENTS

| | | |
|---|---|---|
| 7,231,135 B2 | 6/2007 | Esenyan et al. |
| 7,398,000 B2 | 7/2008 | Green |
| 8,638,056 B2 | 1/2014 | Goldberg et al. |
| 8,953,928 B2 | 2/2015 | Beacham et al. |
| 9,171,477 B2 | 10/2015 | Luo et al. |
| 9,396,669 B2 | 7/2016 | Karkanias et al. |
| 9,485,475 B2 | 11/2016 | Speier et al. |
| 10,592,750 B1 | 3/2020 | Yavagal et al. |
| 10,956,492 B2 | 3/2021 | Barral et al. |
| 11,348,235 B2 | 5/2022 | Barral et al. |
| 2002/0069218 A1 | 6/2002 | Sull et al. |
| 2002/0163532 A1 | 11/2002 | Thomas et al. |
| 2003/0234803 A1 | 12/2003 | Toyama et al. |
| 2007/0288426 A1 | 12/2007 | Schachter |
| 2008/0131853 A1 | 6/2008 | Kunitz |
| 2008/0316304 A1 | 12/2008 | Claus et al. |
| 2009/0210779 A1 | 8/2009 | Badoiu et al. |
| 2009/0327856 A1 | 12/2009 | Mouilleseaux et al. |
| 2010/0115596 A1 | 5/2010 | Horozov et al. |
| 2010/0199295 A1 | 8/2010 | Katpelly et al. |
| 2011/0044538 A1 | 2/2011 | Vanderhoff |
| 2011/0119392 A1* | 5/2011 | Shamilian ........... H04L 65/4015 715/756 |
| 2012/0057847 A1 | 3/2012 | Casagrande |
| 2012/0155834 A1 | 6/2012 | Beacham et al. |
| 2012/0263430 A1 | 10/2012 | Spitzer-Williams |
| 2014/0286533 A1* | 9/2014 | Luo ........................ G06V 40/18 382/103 |
| 2015/0086947 A1 | 3/2015 | Schweid et al. |
| 2015/0297299 A1* | 10/2015 | Yeung ................ A61B 1/00149 600/102 |
| 2016/0014479 A1 | 1/2016 | Gower et al. |
| 2016/0314717 A1 | 10/2016 | Grubbs |
| 2016/0322081 A1 | 11/2016 | Schileru |
| 2017/0053543 A1* | 2/2017 | Agrawal ................ A61B 90/37 |
| 2017/0330598 A1 | 11/2017 | Choi et al. |
| 2018/0047429 A1 | 2/2018 | Smith |
| 2018/0176661 A1* | 6/2018 | Varndell ............ H04N 21/2187 |
| 2018/0247128 A1* | 8/2018 | Alvi ........................ H04L 67/12 |
| 2018/0322949 A1 | 11/2018 | Mohr et al. |
| 2019/0090969 A1* | 3/2019 | Jarc .......................... A61B 34/25 |
| 2019/0110856 A1* | 4/2019 | Barral ................... G06F 16/739 |
| 2019/0279765 A1* | 9/2019 | Giataganas ............. G06F 3/014 |
| 2019/0286652 A1* | 9/2019 | Habbecke ............... A61B 90/37 |
| 2020/0194111 A1* | 6/2020 | Venkataraman ....... G16H 40/63 |
| 2020/0268457 A1* | 8/2020 | Wolf ...................... G16H 50/20 |

FOREIGN PATENT DOCUMENTS

| | | |
|---|---|---|
| CN | 101127870 | 2/2008 |
| CN | 105518783 | 4/2016 |
| JP | 2002044586 | 2/2002 |
| KR | 101352999 | 2/2014 |
| WO | 2015114196 | 8/2015 |
| WO | 2017083768 | 5/2017 |
| WO | 2019079430 | 4/2019 |

OTHER PUBLICATIONS

Bernd Munzer, "Relevance Segmentation of Laparoscopic Videos",Feb. 24, 2014,2013 IEEE International Symposium on Multimedia,pp. 84-88.*
Xiaofei Du, "Patch-based adaptive weighting with segmentation and scale (PAWSS) for visual tracking in surgical video",Jul. 4, 2019, Medical Image Analysis 57 (2019) pp. 120-127.*
Krader et al., "Endoscopy Offers Valuable Adjunct in Cataract Surgery", Ophthalmology Times, Available Online at: https://www.ophthalmologytimes.com/view/endoscopy-offers-valuable-adjunct-cataract-surgery, Jan. 1, 2014, 3 pages.*
U.S. Appl. No. 16/162,898 , Final Office Action, dated Jul. 10, 2020, 45 pages.
U.S. Appl. No. 16/162,898 , Non-Final Office Action, dated Jan. 9, 2020, 32 pages.
U.S. Appl. No. 16/162,898 , Notice of Allowance, dated Oct. 30, 2020, 9 pages.
U.S. Appl. No. 16/162,898 , "Supplemental Notice of Allowability", dated Feb. 9, 2021, 4 pages.
U.S. Appl. No. 16/807,629 , Non-Final Office Action, dated Sep. 9, 2021, 17 pages.
U.S. Appl. No. 16/807,629 , Notice of Allowance, dated Jan. 20, 2022, 13 pages.
U.S. Appl. No. 17/176,795 , Non-Final Office Action, dated Mar. 28, 2022, 29 pages.
Chen , "How to Bookmark and Share Specific Portions of an Online Video", Available online at: https://www.guidingtech.com/5116/share-specific-parts-of-youtube-video-blipsnips/, Sep. 2, 2010, pp. 1-3.
Application No. CN201880067999.8 , Notice of Decision to Grant, dated Dec. 29, 2021, 4 pages.
Application No. CN201880067999.8 , Office Action, dated Jun. 15, 2021, 7 pages.
Du et al., "Patch-Based Adaptive Weighting with Segmentation and Scale (PAWSS) for Visual Tracking in Surgical Video", Medical Image Analysis, vol. 57, Jul. 4, 2019, pp. 120-135.
Guggenberger et al., "Event Understanding in Endoscopic Surgery Videos", Proceedings of the 1st ACM International Workshop on Human Centered Event Understanding from Multimedia, Nov. 2014, pp. 17-22.
Jin et al., "Tool Detection and Operative Skill Assessment in Surgical Videos Using Region-Based Convolutional Neural Networks", IEEE Winter Conference on Applications of Computer Vision, May 7, 2018, 9 pages.
Application No. JP2020-518783 , Office Action, dated Jan. 14, 2022, 3 pages.
Münzer et al., "Relevance Segmentation of Laparoscopic Videos", IEEE International Symposium on Multimedia, Feb. 24, 2014, 8 pages.
Patkar , "5 Better Alternatives to Pocket that Bookmark Anything for Later", Available Online at: https://www.makeuseof.com/tag/better-alternatives-pocket-bookmark-anything-later/, Apr. 15, 2017, pp. 1-9.
Application No. PCT/US2018/056260 , International Preliminary Report on Patentability, dated Apr. 30, 2020, 9 pages.
Application No. PCT/US2018/056260 , International Search Report and Written Opinion, dated Jan. 29, 2019, 13 pages.
Application No. PCT/US2020/022540 , International Preliminary Report on Patentability, dated Oct. 7, 2021, 10 pages.
Application No. PCT/US2020/022540 , International Search Report and Written Opinion, dated Jul. 2, 2020, 13 pages.
PCT/US2020/022540 , "Invitation to Pay Additional Fees and,

(56) References Cited

OTHER PUBLICATIONS

Where Applicable, Protest Fee", dated May 7, 2020, 2 pages.
Sun et al., "Engineering a Video Analysis-based E-book Turning System", Journal of Shaanxi University of Science and Technology, vol. 29, No. 4, Aug. 2011, pp. 24-28.
Application No. JP2020-518783, Office Action, dated Jun. 21, 2022, 3 pages (Machine Translation).
Canadian Application No. 3,079,559 , "Office Action", dated Nov. 30, 2022, 4 pages.
Japanese Application No. 2020-518783 , "Notice of Decision to Grant", dated Feb. 13, 2023, 3 pages.
U.S. Appl. No. 17/176,795 , "Final Office Action", dated Oct. 6, 2022, 33 pages.
U.S. Appl. No. 17/176,795, Office Action, dated Apr. 12, 2023.
Canada Patent Application No. 3079559, Examination Report, dated May 12, 2023.
Europe Patent Application No. 18797398.7, Office Action, dated Aug. 17, 2023.

\* cited by examiner

SURGICAL VIDEO CONSUMPTION BY IDENTIFYING USEFUL SEGMENTS IN SURGICAL VIDEOS

CROSS-REFERENCE TO RELATED APPLICATION

This application is a continuation of U.S. patent application Ser. No. 16/807,629, filed Mar. 3, 2020, which claims priority to U.S. Provisional Patent Application No. 62/822,106, filed Mar. 22, 2019, the entirety of which are hereby incorporated by reference.

FIELD

The present application generally relates to video processing, and more particularly relates to identifying useful video segments in surgical videos using video processing techniques to improve the consumption of surgical videos.

BACKGROUND

As robotic surgeries become more and more popular, a large volume of surgical videos are being recorded every day, especially for laparoscopic surgeries. These videos contain valuable information and are important resources for tasks such as surgery analysis and new surgeon training. However, surgical procedures are typically long (on the order of hours) and the corresponding videos are rarely watched in their entireties because surgeons do not have time to watch the hour-long video and also because not everything in the surgical video is worth watching. For example, tasks such as dissecting adhesion or suturing take a long time but are repetitive and may be uninteresting. It is thus not worth watching the portion of the video involving these operations.

SUMMARY

Various examples are described for identifying useful segments of surgical videos for efficient consumption of the surgical videos. One example method includes accessing a video of a surgical procedure; accessing user activities of a plurality of users who have watched the video of the surgical procedure, the user activities comprising operations performed during playback of the video; dividing the video into a plurality of segments; determining a popularity score for each of the plurality of segments based on the operations; identifying one or more useful segments from the plurality of segments based on the popularity scores; generating metadata for the video of the surgical procedure to include an indication of the identified one or more useful segments; and associating the metadata with the video of the surgical procedure.

Another method includes accessing a plurality of videos of a surgical procedure; normalizing the plurality of videos to identify corresponding segments of the plurality of videos; determining, for each video of the plurality of videos, a plurality of video segments; identifying one or more useful segments in the plurality of videos based on common characteristics between corresponding video segments of the plurality of videos or based on different characteristics between corresponding video segments of the plurality of videos; and generating metadata for the plurality of videos of the surgical procedure to include an indication of the identified one or more useful segments; and associating the metadata with the plurality of videos of the surgical procedure.

Another method includes accessing a video; monitoring operations performed by a plurality of users during playback of the video for each respective user of the plurality of users; identifying one or more useful segments from the video based on the operations; generating metadata for the video to include an indication of the identified one or more useful segments; and associating the metadata with the video.

One computing device includes a processor; and a non-transitory computer-readable medium having processor-executable instructions stored thereupon, which, when executed by the processor, cause the processor to: access a video of a surgical procedure; access user activities of a plurality of users who have watched the video of the surgical procedure, the user activities comprising operations performed during playback of the video; divide the video into a plurality of segments; determine a popularity score for each of the plurality of segments based on the operations; identify one or more useful segments from the plurality of segments based on the popularity scores; generate metadata for the video of the surgical procedure to include an indication of the identified one or more useful segments; and associate the metadata with the video of the surgical procedure.

One non-transitory computer-readable medium includes processor-executable instructions to cause a processor to access a plurality of videos of a surgical procedure; normalize the plurality of videos to identify corresponding segments of the plurality of videos; determine, for each video of the plurality of videos, a plurality of video segments; identify one or more useful segments in the plurality of videos based on common characteristics between corresponding video segments of the plurality of videos or based on different characteristics between corresponding video segments of the plurality of videos; generate metadata for the plurality of videos of the surgical procedure to include an indication of the identified one or more useful segments; and associate the metadata with the plurality of videos of the surgical procedure.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
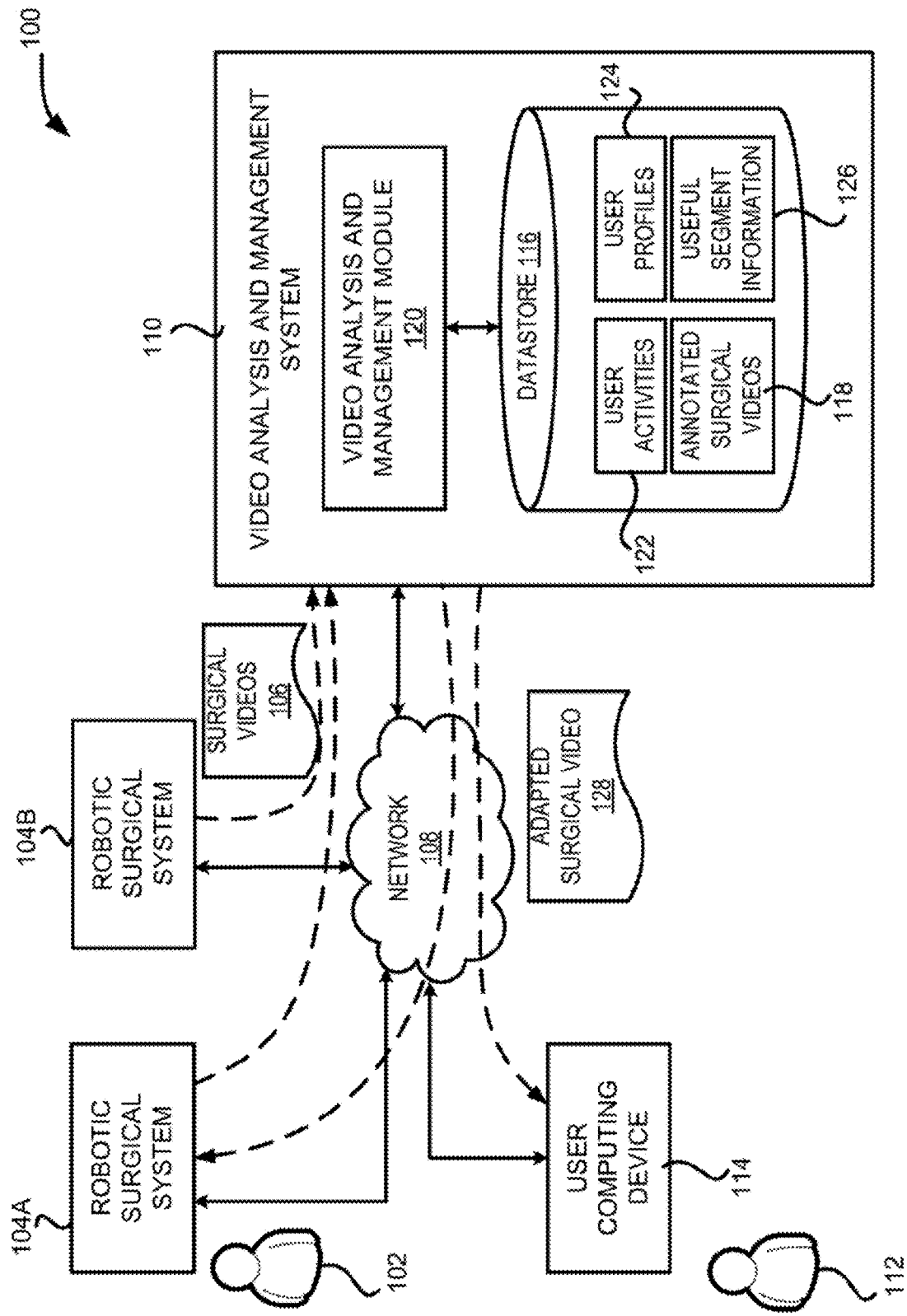
FIG. 1 shows an example of a surgical video consumption environment where useful segments of surgical videos can be identified and used to facilitate users to efficiently consume surgical videos.

Examples are described herein in the context of identifying useful segments in surgical videos and providing useful segments to users for efficient surgical video consumption. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another.

In an illustrative example of identifying useful segments in a surgical video, a video analysis and management system obtains or otherwise accesses a surgical video that contains useful segments that may be of interest to a group of users, such as surgeons. For example, a useful segment includes a portion of the surgical video that involves the use of a particular surgical tool or the performance of a particular surgical task. The surgical video also contains portions that are less useful to the group of users, such as repetitive tasks like suturing. In order to automatically identify useful segments of the surgical video, the video analysis and management system monitors, or cause to be monitored, user activities associated with the video. The user activities include operations performed during the playback of the surgical video by users who have watched the surgical video, also referred to as viewers of the video. The operations include, for example, starting and stopping the video, fast-forwarding through portions of the video, skipping portions of the video, replaying portions of the video, editing the video, creating a clip from the video, commenting on the video or portions of the video, bookmarking the video or portions of the video, or any combination of these.

Based on the user activities, the video analysis and management system compares the operations of the various users and identifies the segments of the surgical video that are popular among these users as potentially useful segments. A popularity score can be determined for each segment of the video based on, for example, the number of users who have watched the segment, i.e. the users did not skip or fast-forward while watching the segment. The popularity score of a segment can also be determined based on the amount of time that these users have spent watching the segment. For example, pausing, rewinding, or reducing the playback speed increases the amount of time a user spent on the segment and thus increases the popularity score of the segment. Other factors such as whether the segment has been bookmarked or commented on, can also be utilized to determine the popularity score of the segment. The video analysis and management system determines a video segment as a useful segment if the segment has the highest popularity score or its popularity score is higher than a predetermined popularity threshold. The video analysis and management system further generates metadata for the surgical video to include an indication of the identified useful segments, and associate the metadata to the surgical video.

When a user requests to watch the surgical video, the video analysis and management system satisfies the user request by generating and transmitting an adapted surgical video including the useful segments. The video analysis and management system also allows a user to specify in the request a watch time limit indicating the maximum amount of time that the user will spend watching the video. If the user's request includes such a watch time limit, the video analysis and management system generates the adapted surgical video by combing a proper number of useful segments so that the time duration of the adapted surgical video is no greater than the watch time limit. In addition, the video analysis and management system can access user preferences to identify a subject that the user is interested in watching and generates the adapted surgical video by including useful segments that contain this particular subject.

In an illustrative example of identifying useful segments from multiple surgical videos, the video analysis and management system compares the multiple surgical videos of a surgical procedure. The video analysis and management system identifies useful segments in the videos based on common characteristics between corresponding video segments of the videos or based on different characteristics between corresponding video segments of the videos. The commonality of or difference among the multiple surgical videos can be measured based on the user activities with regard to the videos, or based on other characteristics of the surgical videos, such as luminance values of video frames, color values of the video frames, motion vectors of the video frame blocks, optical flow analysis, etc., and any combination thereof.

Based on the identified useful segments, the video analysis and management system generates a useful segment information so that the useful segments can be easily identified and retrieved when needed. If a user requests to watch surgical videos, the video analysis and management system uses the useful segment information to retrieve the useful segments that satisfy the user request, and generates an adapted surgical video based on the useful segments for the user. If the user's request includes a watch time limit specifying the maximum amount of time that the user will spend on watching the video, the video analysis and management system generates the adapted surgical video by combing a proper number of useful segments so that the time span of the combined video is no greater than the watch time limit. Similarly, if the user's request, or the preferences of the user in a user profile, specifies a subject that the user is interested in watching, the video analysis and management system generates the adapted surgical video by including useful segments of the video that contain this particular subject.

The video analysis and management system can also handle requests to download, to a robotic surgical system, surgical videos that are relevant to an operation to be performed on the robotic surgical system. In response to such a request, the video analysis and management system identifies, based on the useful segment information, useful segments that are relevant to the surgical operation and generates an adapted surgical video based on these useful segments. In scenarios where the download request specifies a size limit of the downloaded surgical video, the video analysis and management system selectively combines the useful segments so that the adapted surgical video has a size no greater than the size limit.

The technology presented herein improves the content management and the consumption of the large volume of surgical videos. Using the technology presented herein, a large number of surgical videos can be efficiently analyzed, segmented, scored, and identified as being relevant for particular surgical procedures or tasks, and then made available for more efficient viewing to a population of users. The analyzed surgical videos can be annotated with the detected useful segments, thus allowing better indexing and organization of the surgical videos and more efficient retrieval of relevant content. As a result, the response speed to search queries can be increased, and the retrieval time of the relevant portion of the surgical video can be reduced. In addition, by transmitting short but highly relevant and useful video segments, rather than a long surgical video, the technology presented herein significantly reduces the network resources consumption, and also dramatically reduce the time needed by the users to consume the surgical video. Other technical advantages other than those mentioned herein can also be realized from implementations of the technologies disclosed herein.

This illustrative example is given to introduce the reader to the general subject matter discussed herein and the disclosure is not limited to this example. The following sections describe various additional non-limiting and non-exhaustive examples of identifying useful segments in surgical videos and providing useful segments to users for efficient surgical video consumption.

Referring now to FIG. 1, FIG. 1 shows an example of an efficient surgical video consumption environment 100 where useful segments of surgical videos can be identified and used to facilitate users to consume surgical videos. The efficient surgical video consumption environment 100 includes a video analysis and management system 110 configured for storing and processing surgical videos 106 to identify useful segments contained therein. The video analysis and management system 110 is further configured to generate and provide adapted surgical videos 128 for consumption upon request.

The efficient surgical video consumption environment 100 shown in FIG. 1 further includes robotic surgical systems 104A-104B, which may be referred to herein individually as a robotic surgical system 104 or collectively as the robotic surgical systems 104. A robotic surgical system 104 might include (not shown in FIG. 1) a robotic surgical device configured to operate on a patient, a central controller to control the robotic surgical device, and a surgeon console connected to the central controller and the robotic surgical device that is operated by a surgeon 102 to control and monitor the surgeries performed using the robotic surgical device. The robotic surgical device can be any suitable robotic system utilized to perform surgical procedures on a patient. The robotic surgical device might be equipped with cameras, such as an endoscope camera, configured to provide a view of the operating site to guide the surgeon during a surgery.

In some examples, the robotic surgical system 104 may be configured to record data during surgical procedures including images and videos of the surgical procedures performed by the robotic surgical device and captured by the cameras. The robotic surgical system 104 can send the surgical videos 106 to the video analysis and management system 110 through a network 108 for storage, analysis or other operations. The network 108 may be a LAN, a WAN, or any other networking topology known in the art that connects the robotic surgical systems 104 to the video analysis and management system 110.

The video analysis and management system 110 can generate and provide a user interface, such as a web page, to allow a user 112 to request and review the surgical videos 106 through a user computing device 114. The user 112 can be a surgeon, a nurse, a medical trainee, or any individual who is interested in viewing the surgical videos 106. The user computing device 114 can be a personal computer ("PC"), a desktop workstation, a laptop, a notebook, a smartphone, a wearable computing device (such as a smartwatch, a smart glass, a virtual reality head-mounted display), a game console, a set-top box, a consumer electronics device, a server computer, or any other computing device capable of connecting to the network 108 and communicating with the video analysis and management system 110.

To increase the efficiency of the user's consumption of the surgical videos 106, the video analysis and management system 110 further includes a video analysis and management module 120. The video analysis and management module 120 is configured to identify useful segments from the surgical videos 106 and annotate the surgical videos 106 to generate annotated surgical videos 118 to include indications of the identified useful segments. The video analysis and management module 120 has access to a datastore 116 where the annotated surgical videos 118 and other information can be stored.

In one example, the video analysis and management module 120 identifies the useful segments from surgical videos 106 based on user activities 122. The user activities 122 include operations performed by users who have watched or otherwise accessed the surgical videos 106, i.e. the reviewers of the surgical videos 106. The operations can include, for example, starting and stopping the video, fast-forwarding the video, replaying the video, skipping the video, and so on. The operations can further include editing the video, creating a clip from the video or annotating the video such as commenting on the video, bookmarking the video, or any combination thereof. These user activities 122 can be monitored by the video analysis and management system 110 while the viewers watching or accessing the surgical videos 106, or be collected by the video analysis and management system 110 from devices where the user activities are recorded, such as from user computing devices where the user watches or operates on the surgical videos 106. The collected user activities 122 is also stored in the datastore 116.

The video analysis and management module 120 can utilize the user activities 122 to identify useful segments in a single surgical video 106. For example, the video analysis and management module 120 determines that a segment of a surgical video 106 is a useful segment if it is watched by a majority of viewers. On the other hand, if a segment is skipped by most of the viewers, the video analysis and management module 120 determines that the segment is not a useful segment. Other operations can be utilized to determine useful segments. For example, operations on a segment such as uninterrupted playback of the segment, replaying the segment, bookmarking the segment, commenting on the segment are indicative of the segment being a useful segment whereas fast forwarding, skipping, etc. are not indicative of the segment not being a useful segment. Additional examples of utilizing user activities 122 to determine useful segments are provided in FIGS. 2-4.

Likewise, the video analysis and management module 120 can also determine useful segments from multiple surgical videos 106 based on the user activities 122. The video analysis and management module 120 can identify the commonality in the user activities to determine useful segments. For example, portions of the multiple surgical videos that have common characteristics can be identified as useful segments of the surgical videos. The video analysis and management system can also determine difference among the surgical videos 106 to identify a portion of a surgical video that is different from other surgical videos as a useful segment. Other characteristics of the surgical videos, such as luminance values of video frames, color values of the video frames, motion vectors of the video frame blocks, etc. can also be utilized to identify useful segments from the surgical videos 106. Detailed examples of identifying useful segments from multiple surgical videos 106 are described below with regard to FIGS. 2, 4 and 7.

The video analysis and management module 120 further annotates the surgical videos 106 to include indications of the identified useful segments to generate annotated surgical videos 118. For example, the video analysis and management module 120 generates, and associate with a surgical video 106, metadata specifying the start and end time of each of the identified useful segments. In addition, or alternatively, the video analysis and management module 120 can change the content of the surgical video 106 to provide indications of the useful segment, such as by inserting one or more frames before the start frame of the useful segment to identify the useful segment, or by adding text or graphics, e.g., overlay text, to one or more frames of the useful segments to distinguish the useful segments from the rest frames of the surgical video. Various other mechanisms can be utilized to generate the annotated surgical videos 118 to indicate the identified useful segments.

Based on the identified useful segments, the video analysis and management module 120 generates useful segment information 126 to facilitate finding relevant useful segments in response to requests for a surgical video. The useful segment information 126 can include the information about the useful segments, such as the subject covered by a useful segment, the time duration of the useful segment, start or end time of the useful segment, the confidence level of the useful segment, and other information. Detailed examples of the useful segment information 126 are provided below with regard to FIG. 5.

The annotated surgical videos 118 and the identified useful segments contained therein are then utilized to improve the consumption of the surgical videos 106. For example, the video analysis and management system 110 can provide a user interface where users can request to view the surgical videos 106. A user 112, such as a surgeon, who has not watched the surgical videos 106 can send a request through the user interface using the user computing device 114 to request the surgical video 106. Upon receiving the request, the video analysis and management system 110 generates and sends an adapted surgical video 128 based on the identified useful segments of the surgical video 106, instead of sending the surgical video 106 itself. For example, the video analysis and management system 110 can include all the useful segments of the surgical video 106 in the adapted surgical video 128 and exclude at least some portions of the surgical video 106 that are not useful segments. As a result, the adapted surgical video 128 is much shorter than the original surgical video 106 but contains as much useful information as the surgical video 106.

In addition, the user 112 can specify in the request for video, e.g. through the user interface provided by the video analysis and management system 110, a watch time limit. The watch time limit defines the maximum amount of time that the user will spend watching the video. For example, the user 112 can specify that he only has 10 minutes to watch a surgical video 106 whose original time duration is 3 hours. Based on this watch time limit, the video analysis and management system 110 selects a proper number of useful segments to include in the adapted surgical video 128 so that the time duration of the adapted surgical video 128 is no greater than the watch time limit.

The user interface provided by the video analysis and management system 110 can also allow the user to request surgical videos without specifying a particular surgical video. The user 112 may include, in the request, the subject that he or she is interested in watching and the watch time limit. For instance, the user may specify that "I want to improve my suturing skills" or "I want to become proficient at performing partial nephrectomies." Upon receiving the request, the video analysis and management module 120 searches the useful segment information 126 to identify useful segments that contain the same or similar subject as specified in the request. An adapted surgical video 128 is then generated by combining a proper number of these useful segments so that the time duration of the adapted surgical video 128 is no greater than the watch time limit. For example, if the user specifies that he is interested in watching videos to learn how to perform gastric bypass, the video analysis and management module 120 will select the useful segments that involve gastric bypass operations and generate an adapted surgical video 128 with back to back video clips on gastric bypass operations.

When retrieving useful segments that satisfy the user request, the video analysis and management module 120 may also access user profiles 124, which can also be stored in the datastore 116. A user profile 124 includes information about a particular user, such as the name of the user, the role of the user (e.g. a surgeon, a nurse, a management personnel or another type of role), the expertise of the user (e.g. the surgeon is a bariatric surgeon), the style of the user (e.g. the surgeon always takes a long time suturing or the surgeon has performed 300 prostatectomies last year), and the preferences of the user (such as the historical watch time limit, the subjects that the user is interested in, and so on). By accessing the user profile 124, the video analysis and management module 120 can provide suggestions to the user to watch the surgical video, such as "do you want to improve your suturing skills or would you rather learn how to perform a gastric bypass." Based on the user's response, the video analysis and management module 120 selects the useful segments that are of interest to the user even if the user does not explicitly specify that interest in the original request.

The video analysis and management system 110 can also be configured to handle downloading request from a robotic surgical system 104. The video analysis and management system 110 may provide a user interface or an API to allowing users or systems to submit download requests. For example, a robotic surgical system 104 may send a request to the video analysis and management system 110 to request surgical videos that involve the surgical operations to be performed on the requesting robotic surgical system 104. The request may further specify a size of the data that can be downloaded to the robotic surgical system 104. Based on the surgical operations and the size of the data, the video analysis and management module 120 selects proper useful segments and to generate an adapted surgical video 128 containing the selected useful segments for the robotic surgical system 104 to download.

For example, if a surgeon is planning to perform a complex surgery using the robotic surgical system 104, but does not know which of three techniques should be used for a specific step, the robotic surgical system 104 could download useful segments corresponding to the three techniques so that the surgeon can choose the proper video during the operation. This is beneficial especially when the robotic surgical system 104 is no longer connected to the network 108 and the videos would not be available otherwise.

Similar to the user profiles 124, the video analysis and management system 110 may build and maintain system profiles (not shown in FIG. 1) for the robotic surgical systems 104. The system profile for a robotic surgical system 104 can include a schedule of the robotic surgical system 104 where a scheduler enters information about the upcoming procedures (e.g., procedure type, surgical tools to be used, patient name, surgeon name, patient height, weight, comorbidities, etc.). Based on the schedule, the video analysis and management module 120 automatically selects the useful segments that are most relevant to the scheduled procedures for the robotic surgical system 104 to download. For instance, if a new surgical tool is going to be used in an upcoming procedure (as specified in the schedule), the corresponding useful segment can be made available on the robotic surgical system 104. The selection of the useful segments for the robotic surgical system 104 can be further based on information such as the preferences of the surgeon. The downloaded videos can be timely displayed on the robotic surgical system 104 when the corresponding step is performed or the surgical tool is used.

It should be appreciated that while the video analysis and management module 120 is illustrated as being separate from the robotic surgical system 104, it can be implemented as a part of a robotic surgical system 104, for example, to process the surgical videos 106 recorded by that robotic surgical system 104, or surgical videos 106 recorded by other robotic surgical systems 104. A user 112 can thus request the adapted surgical video 128 by interacting with the robotic surgical system 104 directly or through a user computing device 114 communicatively connected to the robotic surgical system 104.

It should be further appreciated that while FIG. 1 illustrates that the same network 108 is utilized for the communication between the robotic surgical system 104 and the video analysis and management system 110, and the communication between the user computing device 114 and the video analysis and management system 110, different networks can be employed. For example, surgical videos 106 can be transmitted from the robotic surgical system 104 to the video analysis and management system 110 over an intranet, whereas the adapted surgical videos 128 can be transmitted from the video analysis and management system 110 to the user computing device 114 over an external network with a secured channel. Likewise, the adapted surgical videos 128 can be downloaded by the robotic surgical systems 104 over a different network.

Figure 2:
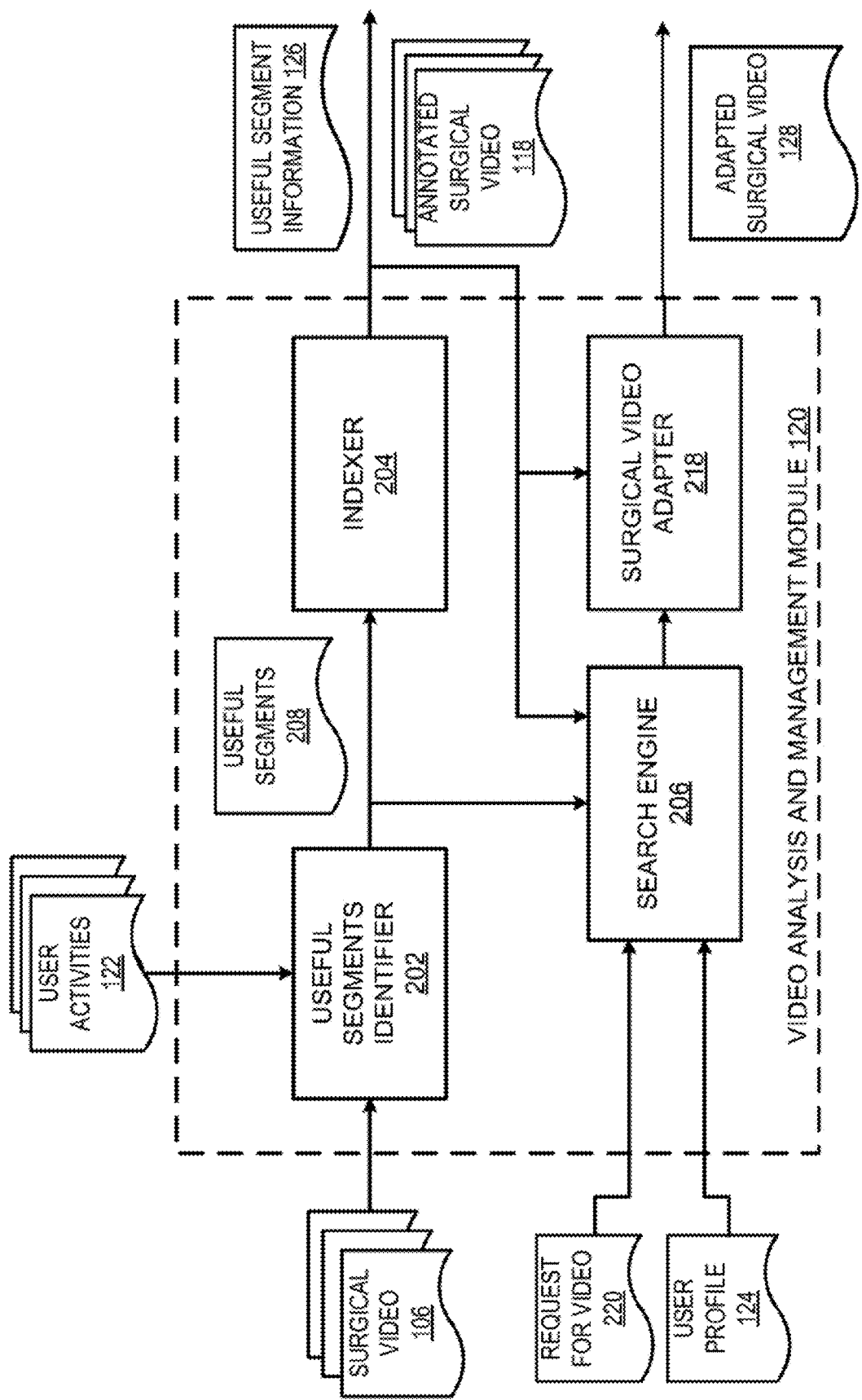
FIG. 2 is a block diagram illustrating aspects of a video analysis and management module configured to identify useful segments from the surgical videos.

FIG. 2 shows a block diagram illustrating aspects of a video analysis and management module 120 configured to identify useful segments from the surgical videos 106. FIG. 2 will be described below in conjunction with FIGS. 3A, 3B and 4. As shown in FIG. 2, the video analysis and management module 120 includes a useful segment identifier 202 configured to identify useful segments from surgical videos 106 and an indexer 204 configured to generate useful segment information 126 for the identified useful segments and to annotate the surgical videos 106. The video analysis and management module 120 shown in FIG. 2 further includes a search engine 206 configured to process a request for video 220 and to identify the useful segments that satisfy the request for video 220 based on the useful segment information 126. The video analysis and management module 120 further employs a surgical video adapter 218 to combine the identified useful segments to generate an adapted surgical video 128 in response to the request for video 220.

In some aspects, the useful segment identifier 202 is configured to identify useful segments from a single surgical video 106. The useful segment identifier 202 accesses user activities 122 describing operations on the surgical video 106 performed by users who have watched the surgical video 106, i.e. viewers of the surgical videos 106. The operations can include, but are not limited to, starting and stopping the video, fast-forwarding the video, replaying the video, skipping the video, editing the video, commenting on the video, or bookmarking the video. These operations of a viewer reflect the viewer's opinion regarding the various portions of the surgical video 106. For example, if a viewer thinks a segment of the surgical video 106 is not useful, he would fast-forward or even skip the segment. On the other hand, if a viewer finds a segment useful, he would pause and rewind the segment to watch the segment several times. Likewise, operations of a viewer such as editing, commenting or bookmarking a segment of the video also show that the viewer finds the segment helpful and worth adding notes thereto.

These user activities 122 thus provide valuable information about the surgical video 106 which can be utilized to identify and recommend useful segments for users who have not watched the surgical video 106. In some implementations, the user activities 122 utilized to identify useful segments are from reviewers who are similar to the users who will watch the surgical video 106 in the future. In other words, the users and the viewers are from the same group of individuals. This is because different users may have different opinions about the usefulness of a video segment. For instance, a video segment involving a special type of suturing skill might be of interest to a surgeon, but might not be useful for a maintenance person who is interested in viewing how a surgical tool functions during operation. The video analysis and management module 120 determines if viewers and users are from the same group based on the information of the users and viewers, such as their information contained in the user profiles 124. However, using the same population for both viewers and users of the video is not required.

Figure 3A:
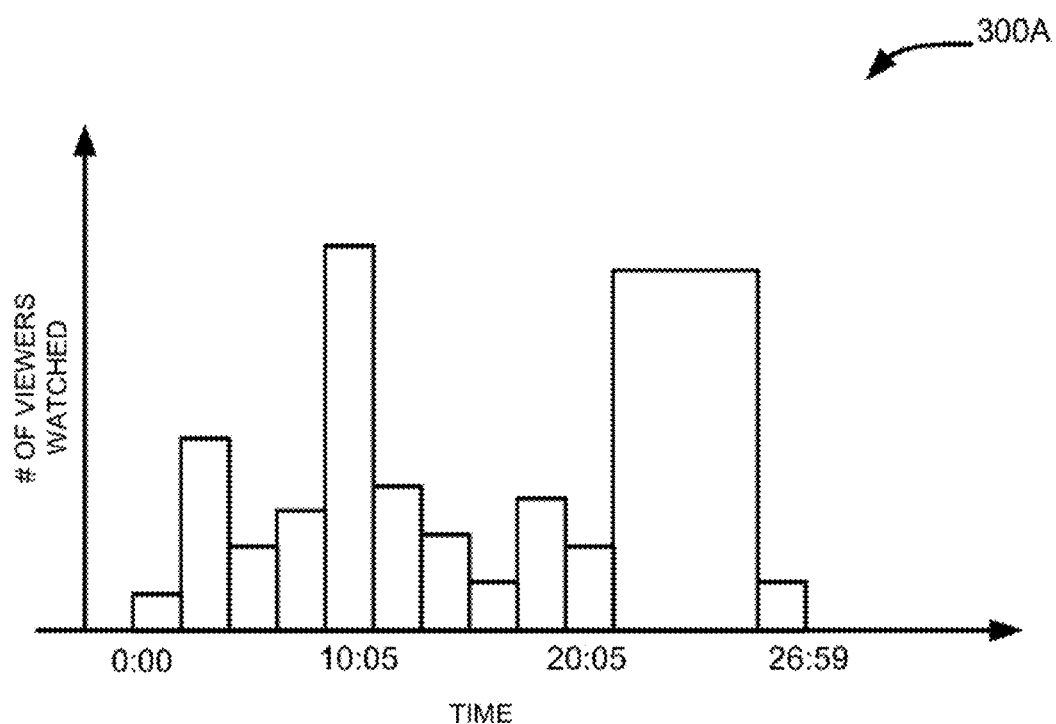
FIG. 3A shows an example of a diagram indicating the popularity of portions of a surgical video based on activities of users who have watched the surgical video.

According to some aspects, the useful segment identifier 202 analyzes the user activities 122 to determine popularity scores for segments of the surgical video 106. FIG. 3A shows an example of a diagram 300A showing the popularity scores of portions of a surgical video based on user activities 122 of viewers of the surgical video 106. In the example shown in FIG. 3A, the surgical video 106 is divided into segments having a fixed duration, such as a 5-minute duration. The popularity scores of the segments are measured as the number of viewers who actually watched the segment. Whether a viewer has watched a segment can be determined based on the user activities 122. For example, if a viewer does not skip or fast-forward the segment, the segment can be marked as having been watched by the viewer. Similarly, if the segment was played back at its normal speed while the reviewer watching the video, the segment can be determined as having been watched by the viewer. In further examples, the popularity scores can also be determined by assigning different weights to different viewers and their respective activities. For example, a well-known surgeon who has watched the video is assigned more weight in determining the popularity score than a viewer who is less experienced, such as a resident. Similarly, the number of cases that a reviewer has performed can also be utilized as a factor in determining the weight of a viewer. For instance, a viewer who has performed a large number of surgeries is assigned a higher weight than a viewer who has performed a small number of surgeries. Various other ways of assigning weights to different viewers and their corresponding activities can be utilized.

Those segments having the highest popularity scores, i.e. watched by most reviewers or the highest number of viewers, can be identified as useful segments. Alternatively, or additionally, video segments whose popularity scores are higher than a predetermined threshold, i.e. watched by more than a predetermined number of viewers, are identified as useful segments. On the other hand, the useful segment identifier 202 can determine segments corresponding to a portion of the video as not useful segment(s) of the video if the number of users that did not watch the portion of the video meets or exceeds the predetermined threshold. In addition to, or instead of, the number of viewers who watched the segment, the useful segment identifier 202 can also utilize other factors to determine the popularity scores of the segments, such as the number of annotations received on a segment including comments or bookmarks, the number of replays of a segment, and so on.

Figure 3B:
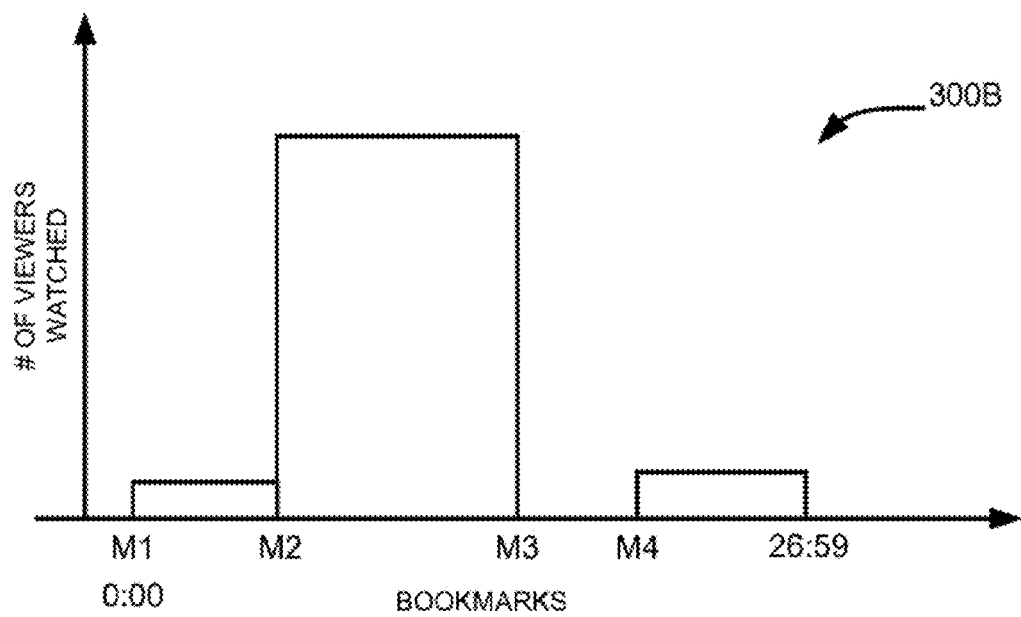
FIG. 3B shows an example of a diagram indicating the popularity of portions of a surgical video that has been bookmarked by users who have watched the surgical video.

FIG. 3B shows another example of a popularity score diagram 300B for a surgical videos 106. In the popularity score diagram 300B, the popularity score of a segment is also computed as the number of reviewers who have watched the segment, but the division of the surgical videos 106 are performed based on bookmarked or other annotations added to the surgical video 106. In other words, instead of using a fixed duration for partitioning the surgical videos 106 into segments, the diagram 300B determines the segments based on the existing bookmarks or annotations. For example, the first segment is defined as the portion of the surgical videos 106 between the first bookmark M1 and the second bookmark M2; the second segment is defined as the portion of the surgical videos 106 between the second bookmark M2 and the third bookmark M3; and so on.

By determining segments using bookmarks or other annotations of the video, the extracted useful segments are more likely to contain a complete task or event than the useful segments extracted based on the fixed time duration as shown in diagram 300A. Thus, in some implementations, the surgical videos 106 can be pre-processed to include annotations specifying phases, steps or stages of the surgical procedure, or even tasks or events occurred during the surgical procedure, such as using machine learning techniques to automatically detect the phases, steps, stages, tasks and events from the surgical videos 106 and insert the corresponding annotations into the surgical videos 106. The annotations can also, or instead, be added manually by experts. In another example, log data obtained from the robotic system where the surgical video is captured can also be utilized to determine the segments of the video. For instance, the log data can include information indicating when a specific surgical tool is loaded to the robotic system during the surgical procedure. Such information can help to determine the stage or tasks of the surgical procedure involved in the portion of the surgical video before and after the loading of the tool. Similarly, the log data can also include information regarding when the camera is moved from one location to another which can provide some indication about the stage or the task of the surgical procedure. These log data can be utilized to annotate the surgical video so that segmentation of the video can be performed based on the annotation. Other log data collected from the robotic surgical system can be utilized in a similar way.

These annotations, such as tags, category labels can also be searched and used to match the request by a user if the user requests a certain category of videos. In further implementations, the usefulness of the segments can be further provided explicitly by viewers. For example, the video analysis and management system 110 can request viewers to score the usefulness of each segment, such as on a 1-10 scale. The video analysis and management module 120 can use these explicit scores provided by the viewers to determine and extract useful segments. In another example, the video analysis and management module 120 compares the current segments of the video with the search queries of the users or the video segments that users have shown interest in watching, to make further video segment recommendations. Based on these video segment recommendations, the video analysis and management module 120 can adjust the segmentation of the video and thus the boundaries of the useful segments 208.

Apart from identifying useful segments 208, the useful segment identifier 202 or other modules further generates recommendations for playing back the surgical video 106. For example, if the video analysis and management module 120 determines that a majority of the viewers of the surgical video 106 have skipped a certain segment, the video analysis and management module 120 can recommend a user to skip the segment. The recommendation can be generated by, for example, modifying the surgical video 106 so that that segment is skipped while being played back. Similarly, if the video analysis and management module 120 determines that most of the viewers (e.g. the a majority of the viewers) fast-forwarded a segment while watching it, the video analysis and management module 120 can cause the segment to be automatically fast-forwarded while being played back. For example, the video analysis and management module 120 can generate and associate metadata with the surgical video 106 to indicate that the playback speed associated with that segment of the surgical video 106 is higher than normal. The automated fast-forward speed can be determined based on the fast-forward speeds used by the viewers, such as by taking the average, mean, or weighted average of those fast-forward speeds.

Figure 4:
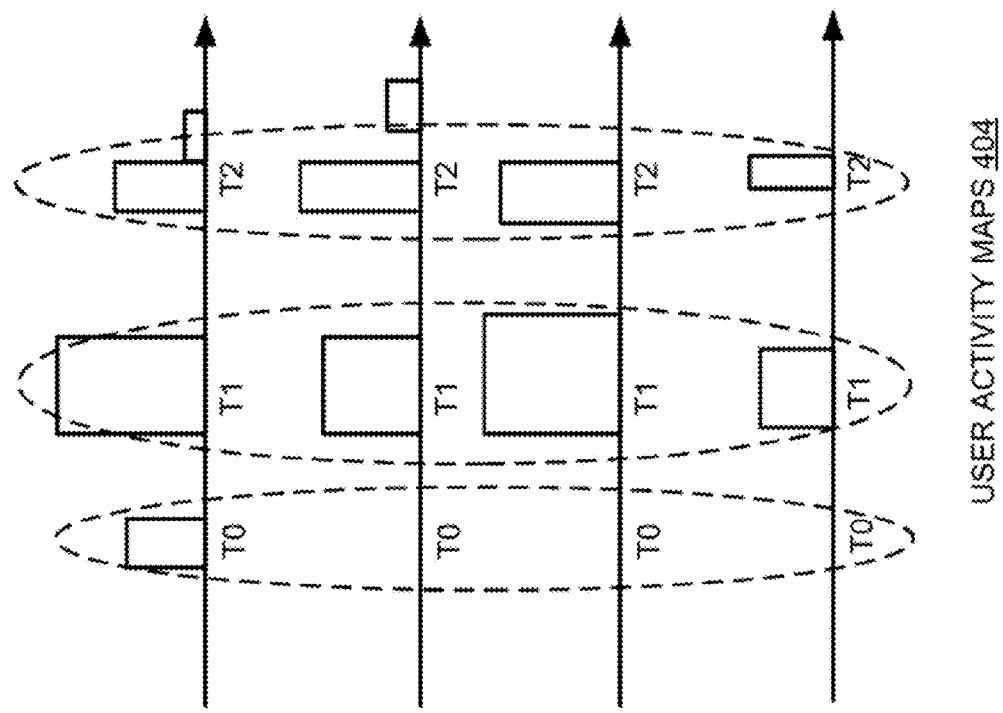
FIG. 4 shows an example of identifying useful segments based on multiple surgical videos.
Figure 4:
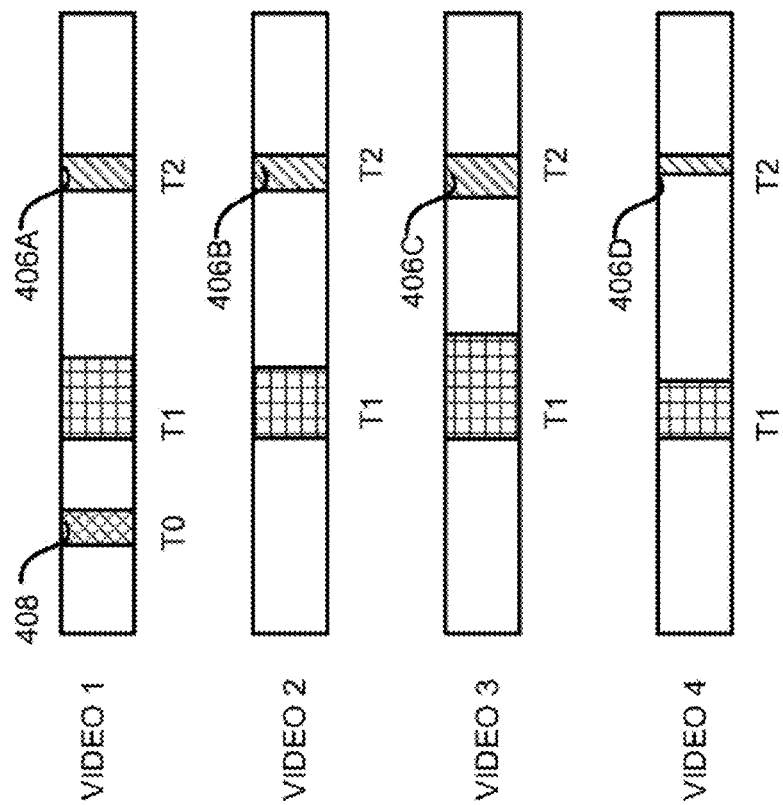

The useful segment identifier 202 can further identify useful segments based on multiple surgical videos 106 of a surgical procedure. FIG. 4 shows an example of identifying useful segments based on multiple surgical videos 106. In this example, videos of four different surgeries performing the same surgical procedure are analyzed. The useful segment identifier 202 normalizes the four surgical videos so that corresponding segments can be found in these videos. For example, the useful segment identifier 202 correlates a segment from a first video with the segments in a second video and identifies the segment in the second video having the highest correlation as the corresponding segment to that in the first video. The correspondence between the segments in different videos can be identified in a similar way. As a result, the useful segment identifier creates a table where each row represents a segment with each column providing the start time for that segment in the corresponding video. Various other ways of normalizing the surgical videos can be utilized. After normalization, the useful segment identifier 202 can determine that segments 406A-406D correspond to the same task, such as an anastomosis. The normalization can be performed using existing labels, bookmarks or annotations indicating the tasks or events occurred in the videos if these annotations are available. In some implementations, the normalization further involves normalizing the time scale of the surgical videos 106 so that the tasks or events are temporally aligned.

Based on the normalized surgical videos, the useful segment identifier 202 can identify useful segments as those segments that have common characteristics among the surgical videos 106. For example, the useful segment identifier 202 generates user activity maps 404 as shown in FIG. 4 based on the user activities 122. The user activity maps can be generated as described above with respect to FIGS. 3A and 3B, that is, based on the number of reviewers of respective segments. Other factors, such as the number of comments received, or the number of replays of the respective segments can also be utilized to generate the user activity maps. Each of the user activity maps corresponds to one surgical video and represents the popularity scores for the segments in that surgical video. In one example, the useful segment identifier 202 utilizes the user activity maps to determine the common characteristics among the multiple surgical videos. In the example shown in FIG. 4, the useful segment identifier 202 uses the user activity maps 404 to determine that those segments around time T1 have common characteristics of high popularity score (e.g. the number of segments having a popularity score higher than a first threshold is higher than a second threshold) and thus can be identified as useful segments. Similarly, the segments 406A-406D around time T2 also share common high popularity score and thus can be identified as useful segments.

In addition to segments with common characteristics, the useful segment identifier 202 can also utilize the user activity maps to identify a segment that has different characteristics than other corresponding segments as a useful segment. In the example shown in FIG. 4, the user activity maps 404 show that segment 408 in video 1 has a high popularity score whereas its corresponding segments in other videos have close to zero popularity scores. This difference indicates that segment 408 might contain useful content that is not observed in other videos, such as an unexpected bleeding event, or other uncommon events in a surgical procedure. The useful segment identifier 202 thus identifies those segments that are distinct from their corresponding segments as useful segments.

It should be understood that while the above example describes using user activities to derive characteristics for identifying useful segments, other characteristics can also be utilized. For example, the useful segment identifier 202 can analyze properties of video frames, such as luminance values, color values, motion vectors of the video frame blocks, or any combination of these properties to derive characteristics.

After identifying the useful segments, the useful segment identifier 202 further annotates the surgical videos 106 to add indications of the useful segments to the surgical videos 106 to generate annotated surgical videos 118. For example, useful segment identifier 202 can generate and associate to the surgical video 106 metadata to specify the start and end time of each of the identified useful segments. In another example, the useful segment identifier 202 can change the content of the surgical video 106 to provide indications of the useful segments, such as by inserting one or more frames before the start frame of a useful segment, or by adding text or graphics to one or more frames of the useful segments to distinguish the useful segments from other frames of the surgical video. Additional information, such as the subject of the useful segments can be identified, for example, based on the events or tasks detected by the machine learning techniques, tools used in the useful segments based on the log data of the robotic surgical system, and so on. These types of additional information can be associated with the useful segments as metadata and be utilized to retrieve relevant video segments, for example, based on user query. Various other mechanisms can be utilized to annotate the surgical videos 106 to generate the annotated surgical videos 118.

Figure 5:
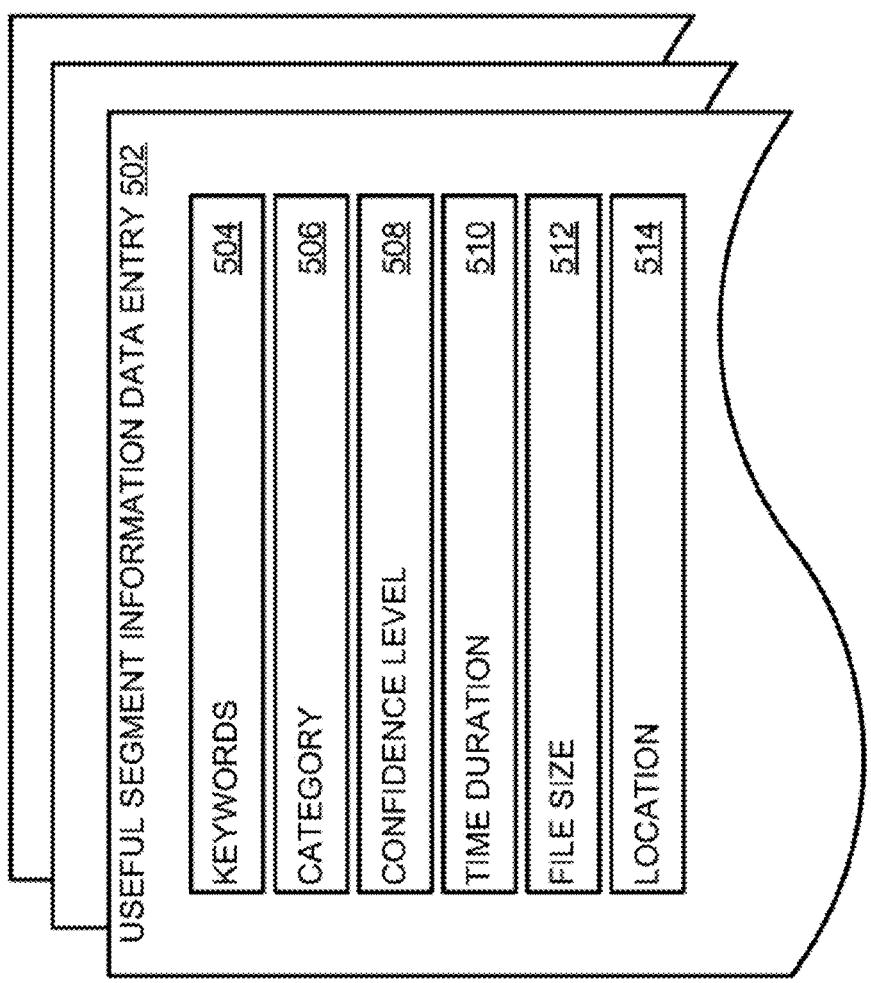
FIG. 5 shows an example data structure of a data entry in the useful segment information built based on useful segments identified from surgical videos.

Based on the identified useful segments 208, the indexer 204 generates useful segment information 126, that includes the information about the useful segments 208 and can be stored as an index or database tables. FIG. 5 shows an example of a data structure of a data entry 502, such as a row in a database table, in the useful segment information 126. The data entry 502 is established for each useful segment and contains keywords 504 describing the subject of the content contained in the segment, such as the surgical skills involved in this segment, the surgical tool used in the segment, the event captured by the segment, and so on.

The data entry 502 shown in FIG. 5 also includes a category 506 describing the category of the useful segment, such as a medical event category including events such as bleeding, a medical task category covering tasks such as suturing or anastomosis, or other categories. The keywords 504 and the category 506 of the useful segment can be extracted from the surgical videos 106 if the surgical videos 106 already contain such information, be generated using machine learning models, or be manually labeled by experts after watching the useful segment.

The data entry 502 further includes a confidence level 508 indicating how confident the system is when determining the segment as a useful segment. In one example, the confidence level 508 can include the popularity score generated when determining the useful segment. The higher the popularity score is, the higher the confidence level is. As will be discussed below, the confidence level 508 can be utilized by the video analysis and management module 120 to select useful segments to be included in the adapted surgical video 128 in response to a request for video.

The data entry 502 also includes other information about the useful segment, such as the time duration 510, the file size 512 and the location 514 of the useful segment in the corresponding annotated surgical video 118. The time duration 510 can be utilized, for example, to determine if the adapted surgical video 128 exceeds the watch time limit of a requesting user. The file size 512 is useful when determining if the adapted surgical video 128 exceeds the file size limit of a requesting surgical robot. The location 514 is utilized to retrieve the useful segments from the respective annotated surgical videos 118 to generate the adapted surgical video 128.

Based on the useful segment information 126, the search engine 206 of the video analysis and management module 120 is able to satisfy a request for video from a user or a robotic surgical system 104. Upon receiving the request for a video, the search engine 206 searches the useful segment information 126 to select useful segments 208 that meet the criteria of the user request, such as containing the same or similar subject as specified in the request or derived based on user's profile, meeting the watch time limit, meeting the size limit, and so on. In some implementations, the search engine 206 selects the useful segments 208 in descending order of the confidence levels of the useful segments. In other words, the useful segment having a higher confidence level is selected before a useful segment having a lower confidence level.

The selected useful segments are then combined by the surgical video adapter 218 to generate the adapted surgical video 128. The surgical video adapter 218 can utilize any video processing technologies to combine these useful segments, including decoding the useful segments, adjusting the frame resolutions of the useful segments to be consistent throughout the adapted surgical video 128, adjusting the frame rates of the useful segments, adjusting the compression rate of these useful segments, inserting transition frames between useful segments, re-encoding the combined useful segments using a single video coding standard and so on.

Figure 6:
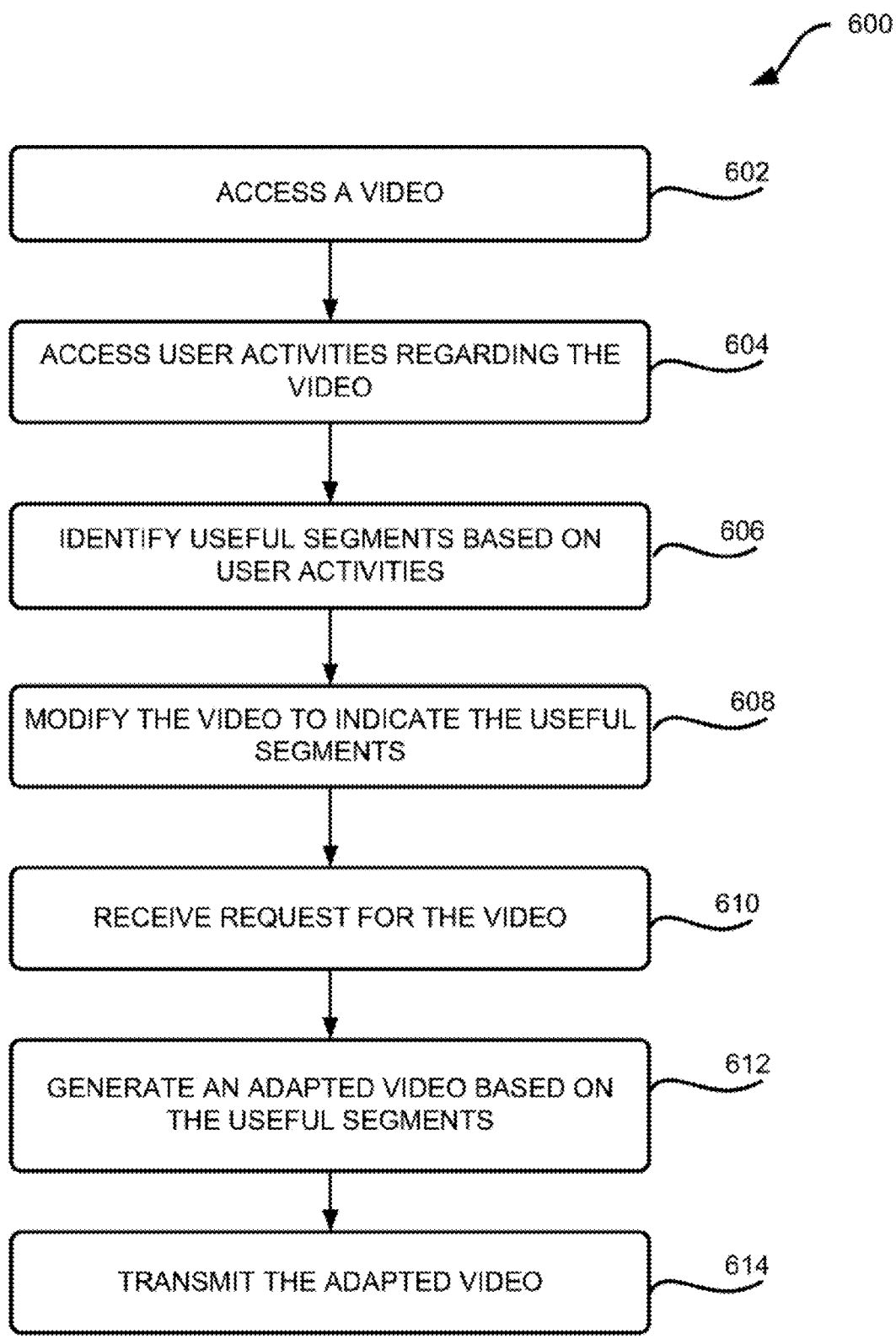
FIG. 6 shows an example of a process for identifying useful segments in a surgical video and serving the useful segments for consumption by users.

Referring now to FIG. 6, where an example of a process 600 for identifying useful segments in a single surgical video and serving the useful segments for consumption by users. The example process 600 will be discussed with respect to the example environment 100 shown in FIG. 1, but may be employed according to any suitable system according to this disclosure.

At block 602, the video analysis and management system 110 accesses a surgical video 106 from which useful segments are to be identified. The surgical video 106 can be received from a robotic surgical system 104 or be accessed from the datastore 116 where the surgical video 106 is received and stored beforehand. At block 604, the video analysis and management system 110 accesses user activities 122 associated with the surgical video 106. As discussed above in detail with regard to FIG. 2, the user activities 122 describe operations with regard to the surgical video 106 by viewers, i.e. users who have watched the surgical video 106. The operations include, but are not limited to, starting and stopping the video, fast-forwarding the video, replaying the video, skipping the video, editing the video, commenting on the video, bookmarking the video, or any combination of these. The user activities 122 can be obtained by the video analysis and management system monitoring the operations of the viewers. Alternatively, the video analysis and management system 110 can obtain user activities associated with the video by causing another system to monitor the operations of the viewers.

At block 606, the video analysis and management system 110 identifies useful segments based on the user activities 122. In one example, the video analysis and management system 110 divides the surgical video 106 into segments, such as based on a fixed duration or based on bookmarks added to the surgical video 106. The video analysis and management system 110 generates a popularity score for each of the segments. For example, the video analysis and management system 110 can generate the popularity score for a segment based on factors such as the number of viewers of the segment, the number of comments added to the segment, the number of bookmarks added by viewers to the segment, how well the video segment's annotations match against the user's search queries, or any combination of these. The video analysis and management system 110 calculates a weighted summation of the values of these factors, and normalize the sum to a scale, such as 1-10 scale or 0-1 scale, to determine the popularity score.

Based on the popularity score, the video analysis and management system can determine a segment as a useful segment if the segment has the highest popularity score. Alternatively, a segment can be determined to be a useful segment if the popularity score of the segment is higher than a predetermined threshold. Other ways of determining useful segments based on the popularity scores can be used. Other ways of determining useful segments without popularity scores can also be utilized, such as using a machine learning model taking user activities of a segment as input and outputting an indication of whether the segment is a useful segment. In some examples, the identified useful segments and non-useful segments can be overridden by a user who manually specifies the usefulness of a segment, e.g., a professor or head of surgery. Other mechanisms of identifying useful segments described above with regard to FIGS. 2-3 can also be utilized.

At block 608, the video analysis and management system 110 modifies the surgical video 106 to include an indication of the identified useful segments and to generate an annotated surgical video 118. For example, the video analysis and management system 110 can generate and associate with the surgical video 106 metadata to specify the start and end time of each of the identified useful segments. Metadata may be inserted within the video file itself or may be stored in a separate data file, or may be stored in one or more records in a database. In another example, the video analysis and management system 110 can change the content of the surgical video 106 to provide indications of the useful segment, such as by inserting one or more frames before the start frame of the useful segment, or by adding text or graphics to one or more frames of the useful segments to distinguish the useful segments from the rest frames of the surgical video. Various other mechanisms described above with regard to FIGS. 1-2 can be utilized to generate the annotated surgical video 118 to indicate the identified useful segments.

At block 610, the video analysis and management system 110 receives a request for the video. As discussed above in detail with regard to FIG. 2, the request might be received from a user who has not watched the surgical video 106. The request may specify the watch time limit indicating the maximum amount of time that the user will spend watching the video. The request may further specify the subject that the user is interested in.

In order to enable the user to efficiently consume the surgical video 106 within the watch time limit, the video analysis and management system 110, at block 612, generates an adapted surgical video 128 based on the useful segments identified at block 606. The video analysis and management system 110 selects a number of useful segments for the adapted surgical video 128 so that the time span of the adapted surgical video 128 is no greater than the watch time limit. In one example, useful segments having higher popularity scores are selected before useful segments with lower popularity scores are selected. If the request includes the subject that the user is interested in, the video analysis and management system 110 selects the useful segments that match the subject for the generation of the adapted surgical video 128. The video analysis and management system 110 may also access a user profile 124 of the user to select useful segments that match the user profile 124, such as by matching typical surgical procedures performed by the user or educational interests of the user.

Once the useful segments have been selected, a new video is generated by concatenating the segments together into a single video. In some examples, one or more frames may be inserted between individual segments to identify the beginning or end of a particular segment. In some examples, the individual segments may each be separately transmitted to the user for individual viewing. The names of the individual videos may indicate the content of the segment, such as based on keywords associated with the segment in the metadata or information about the surgical procedure from the original video. Other mechanisms of generating an adapted surgical video 128 described above with regard to FIG. 2 can also be utilized. The video analysis and management system 110 then transmits the adapted surgical video(s) 128 to the requesting user at block 614.

Figure 7:
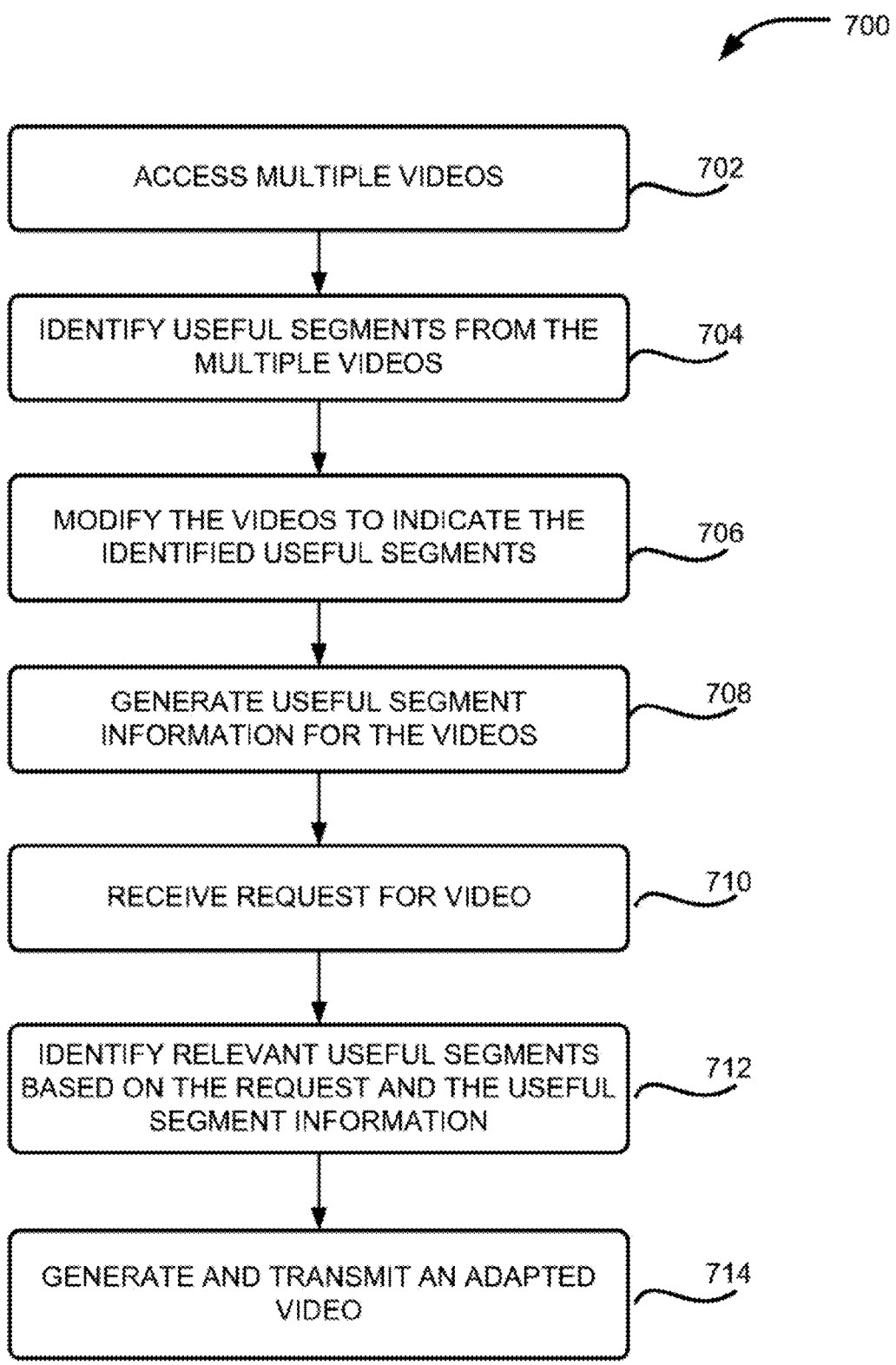
FIG. 7 shows an example of a process for identifying useful segments in multiple surgical videos and serving the useful segments for consumption by users.

Referring now to FIG. 7, where an example process 700 for identifying useful segments in multiple surgical videos and serving the useful segments for consumption is illustrated. The example process 700 will be discussed with respect to the example environment 100 shown in FIG. 1, but may be employed according to any suitable system according to this disclosure.

At operation 702, the video analysis and management system 110 accesses multiple surgical videos 106 for the same surgical procedure. The multiple surgical videos 106 can be obtained from multiple robotic surgical systems 104 performing the same surgical procedure or from the same robotic surgical system 104 that performed the same surgical procedure at different time. The surgical videos 106 can be transmitted from the robotic surgical systems 104 to the video analysis and management system 110 and stored in the datastore 116 for analysis.

At block 704, the video analysis and management system 110 identifies useful segments from the multiple surgical videos 106. In one example, portions of the multiple surgical videos that have common characteristics, such as being watched by a large number of users, can be identified as useful segments of the surgical videos. In another example, the video analysis and management system 110 also identifies a portion of a surgical video that is different from the corresponding portions of other surgical videos as a useful segment. As discussed in detail above with regard to FIGS. 2 and 4, the commonality of or difference among the multiple surgical videos can be measured based on the user activities with regard to the videos during playback of the videos, or other characteristics of the surgical videos, such as luminance values of video frames, color values of the video frames, motion vectors of the video frame blocks, and any combination thereof. For example, multiple users may have replayed a segment of a video showing a suturing operation, while skipping over the same suturing operation in other videos for the same procedure. Thus, the video segment may be identified as useful.

At block 706, the video analysis and management system 110 modifies the surgical videos 106 to include indications of the identified useful segments. The modification of each surgical video 106 can be performed in a way similar to that described with regard to block 608, such as by adding metadata, or by modifying the content of the surgical video 106. At block 708, the video analysis and management system 110 generates useful segment information 126 for the surgical videos 106. In one example, the useful segment information 126 can be stored as an index or a database table that includes a data entry for each of the useful segments. A data entry includes information about the useful segment such as the keywords, the category, the confidence, the time duration, the file size, the location of the useful segment, and so on. Other mechanisms of generating and storing useful segment information 126 that are described above with regard to FIGS. 2 and 5 can also be utilized.

At block 710, the video analysis and management system 110 receives a request for video. The request can be a request from a user to watch surgical videos, or a request to download surgical videos to a robotic surgical system 104. The request can include information such as the watch time limit, the file size limit of the requested video, the subject of the video, and so on.

In response to the request, the video analysis and management system 110, at block 712, queries the useful segment information 126 to identify the useful segments that satisfy the request as described above in detail with regard to FIG. 2. For example, the video analysis and management system 110 can identify the useful segments that match the subject specified in the request or in a user profile and select a number of useful segments, in a descending order of confidence levels of the useful segments, so that the total time duration of the selected useful segments does not exceed the watch time limit. Similarly, for a request to download, the video analysis and management system 110 selects useful segments that match the robotic surgical system 104, e.g. involving surgical operations to be performed on the robotic surgical system 104, and that have a total size no greater than the size limit of the surgical robot.

At block 714, the video analysis and management system 110 combines the selected useful segments to generate an adapted surgical video 128. For example, the video analysis and management system 110 may, among others, decode the useful segments, adjust the frame resolutions, frame rates, or compression rates of these useful segments, insert transition frames between useful segments, and re-encode the combined useful segments to generate a single video file or multiple video files as the adapted surgical video 128. Other mechanisms of generating an adapted surgical video 128 described above with regard to FIG. 2 can also be utilized. The video analysis and management system 110 then transmits the adapted surgical video 128 to the requesting user.

Figure 8:
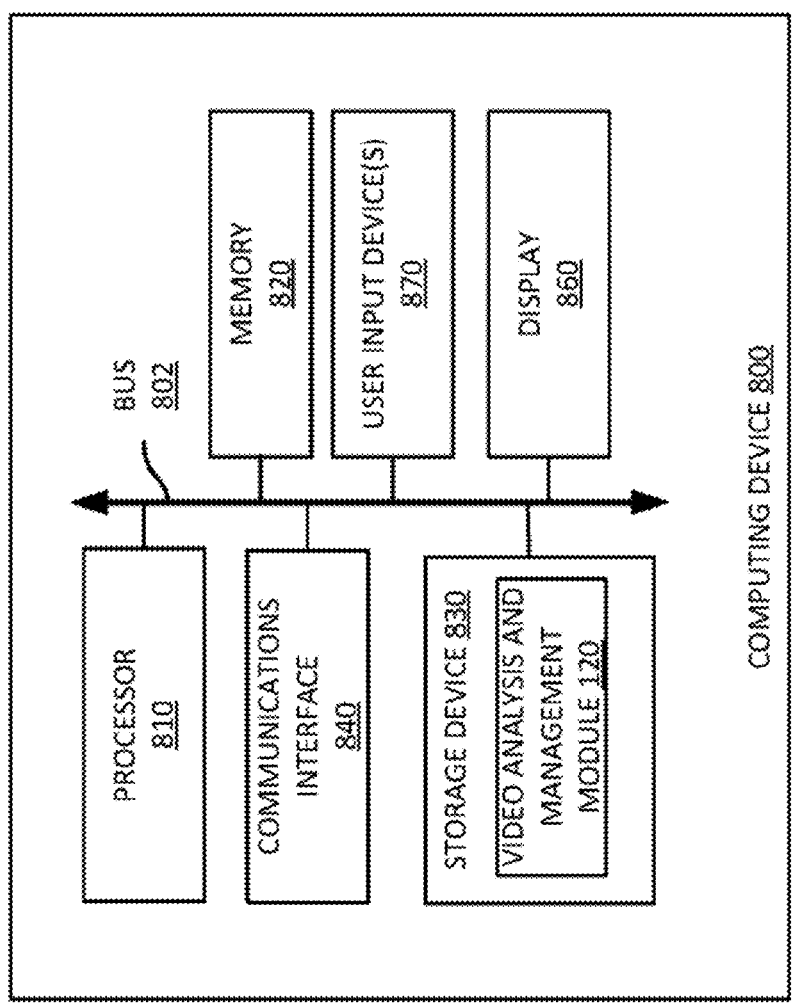
FIG. 8 shows an example of a computing device suitable for implementing aspects of the techniques and technologies presented herein.

Referring now to FIG. 8, FIG. 8 shows an example computing device 800 suitable for use in example systems or methods for identifying useful segments in surgical videos and providing the useful segments to users for efficient surgical video consumption. The example computing device 800 includes a processor 810 which is in communication with the memory 820 and other components of the computing device 800 using one or more communications buses 802. The processor 810 is configured to execute processor-executable instructions stored in the memory 820 to perform identifying useful segments of surgical videos for efficient consumption of the surgical videos according to different examples, such as part or all of the example processes 600 and 700 described above with respect to FIGS. 6-7. The computing device, in this example, also includes one or more user input devices 870, such as a keyboard, mouse, touchscreen, microphone, etc., to accept user input. The computing device 800 also includes a display 860 to provide visual output to a user.

The computing device 800 can include or be connected to one or more storage devices 830 that provides non-volatile storage for the computing device 800. The storage devices 830 can store system or application programs and data utilized by the computing device 800, such as modules implementing the functionalities provided by the video analysis and management module 120. The storage devices 830 might also store other programs and data not specifically identified herein.

The computing device 800 also includes a communications interface 840. In some examples, the communications interface 840 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example non-transitory computer-readable storage media, that may store instructions that, when executed by the processor, can cause the processor to perform the steps described herein as carried out, or assisted, by a processor. Examples of non-transitory computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
   dividing a video of a surgical procedure into a plurality of segments based, at least in part, upon (a) log data obtained from a robotic system where the video of the surgical procedure is captured or (b) detected surgical phases or events by applying a machine learning model on the video;
   pre-processing the video to include annotations specifying phases or events of the surgical procedure;
   accessing user activities of a plurality of users who have watched the video of the surgical procedure, the user activities comprising operations performed during playback of the video;
   determining a popularity score for each of the plurality of segments based on assigning weights to the operations according to experience levels of the plurality of users or insertion or use of a surgical tool;
   identifying one or more useful segments from the plurality of segments based on the popularity scores; and
   associating an indication of the identified one or more useful segments with the video of the surgical procedure.

2. The method of claim 1, wherein the operations of the plurality of users comprise starting the video, stopping the video, fast-forwarding the video, replaying the video, skipping the video, editing the video, creating a clip from the video, commenting on the video, or bookmarking the video.

3. The method of claim 1, wherein the popularity score is determined based on a number of users that watched a segment of the video, and wherein identifying the one or more useful segments of the video comprises:
   in response to determining that the popularity score of the segment meets or exceeds a threshold, identifying the segment of the video as a useful segment of the video.

4. The method of claim 1, wherein the popularity score is determined based on a number of users that annotated a segment of the video, and wherein identifying the one or more useful segments of the video comprises:
   in response to determining that the popularity score meets or exceeds a threshold, identifying the segment of the video as a useful segment of the video.

5. The method of claim 1, wherein associating an indication of the identified one or more useful segments with the video of the surgical procedure comprises:
   generating metadata for the video to include the indication of the identified one or more useful segments; and
   associating the metadata with the video.

6. The method of claim 5, further comprising:
   identifying a portion of the video that does not contain a useful segment based on the operations of the plurality of users;

generating additional metadata for the video of the surgical procedure to include an indication of the identified portion of the video; and
associating the additional metadata with the video of the surgical procedure.

7. The method of claim 6,
wherein identifying the portion of the video comprises identifying a portion of the video that is not of interest to the plurality of the users based on the operations, and
wherein generating additional metadata for the video of the surgical procedure to include an indication of the identified portion of video comprises generating the additional metadata to indicate that the portion of the video is not to be played back in a normal speed of the video.

8. The method of claim 5, further comprising:
receiving a request to watch the video, the request comprising a watch time limit specifying the maximum amount of time that a user associated with the request will spend watching the video; and
generating an adapted video by combining one or more of the one or more useful segments to create the adaptive video having a time duration no greater than the watch time limit.

9. The method of claim 8, further comprising:
associating additional metadata with the video of the surgical procedure to include an indication of a subject contained in the identified one or more useful segments that is extracted based on machine learning techniques;
accessing a user preference associated with the user, the user preference specifying a subject that the user is interested in watching; and
generating the adapted video by including, based on the additional metadata, the one or more useful segments of the video that contain the subject that the user is interested in watching.

10. A method comprising:
normalizing a plurality of videos of a surgical procedure to identify corresponding segments of the plurality of videos;
determining, for each video of the plurality of videos, a plurality of video segments based, at least in part, upon (a) log data obtained from a corresponding robotic system where the video is captured or (b) detected surgical phases or events by applying a machine learning model on the video;
pre-processing each video of the plurality of videos to include annotations specifying phases or events of the surgical procedure;
identifying one or more useful segments in the plurality of videos based on different characteristics between corresponding video segments of the plurality of videos; and
associating an indication of the identified one or more useful segments with the plurality of videos of the surgical procedure.

11. The method of claim 10, wherein identifying one or more useful segments in the plurality of videos is performed further based on common characteristics of the plurality of videos, the common characteristics comprising user activities of a plurality of users who have watched the plurality of videos, the user activities comprising operations of the plurality of users performed during playback of the plurality of videos.

12. The method of claim 10, further comprising:
receiving a request to watch a video, the request comprising a watch time limit specifying the maximum amount of time that a user associated with the request will spend in watching the video; and
generating an adapted video by combining one or more of the one or more useful segments of the plurality of videos to create the adapted video having a time duration no greater than the watch time limit.

13. The method of claim 12, further comprising:
accessing a user preference associated with the user, the user preference specifying a subject that the user is interested in watching; and
generating the adapted video by including the one or more useful segments of the plurality of videos that contain the subject that the user is interested in watching.

14. The method of claim 10, further comprising:
receiving a request to download a video to a surgical robot, the request specifying a size of the video to be downloaded and a surgical operation to be performed on the surgical robot;
identifying, from the one or more useful segments of the plurality of videos, a plurality of useful segments that are relevant to the surgical operation;
generating an adapted video based on the plurality of useful segments that has a size no greater than the size of the video to be downloaded to the surgical robot; and
transmitting the adapted video to the surgical robot.

15. The method of claim 10, wherein associating an indication of the identified one or more useful segments with the video of the surgical procedure comprises:
generating metadata for the video to include the indication of the identified one or more useful segments; and
associating the metadata with the video.

16. A method comprising:
identifying one or more useful segments from a video based on operations performed by a plurality of users during playback of the video;
receiving a request to watch the video, the request comprising a watch time limit specifying the maximum amount of time that a user associated with the request will spend watching the video;
accessing a user preference associated with the user, the user preference specifying a subject that the user is interested in watching; and
generating an adapted video by selecting one or more useful segments of the video that contain the subject that the user is interested in watching and combining the one or more useful segments to create the adaptive video having a time duration no greater than the watch time limit.

17. The method of claim 16, wherein the video comprising a video of a surgical procedure.

18. The method of claim 16, wherein identifying one or more useful segments from the video based on the operations comprises:
in response to determining that a number of users that watched a segment of the video meets or exceeds a threshold, identifying the segment of the video as a useful segment of the video.

19. The method of claim 16, further comprising:
generating metadata for the video to include an indication of the identified one or more useful segments; and
associating the metadata with the video.

20. The method of claim 16, wherein the operations performed by the plurality of users comprise starting the video, stopping the video, fast-forwarding the video, replaying the video, skipping the video, editing the video, creating a clip from the video, commenting on the video, or bookmarking the video.

\* \* \* \* \*